2,714,103

MONOAZO DYESTUFFS

Achilles Conzetti, Lugano, Switzerland, assignor to J. R. Geigy A. G., Basel, Switzerland, a Swiss firm No Drawing. Application January 28, 1954,
Serial No. 406,882

Claims priority, application Switzerland February 18, 1953

7 Claims. (Cl. 260—198)

The present invention concerns a process for the production of monoazo dyestuffs which are suitable for the dyeing of natural and synthetic polypeptide fibres in fast bluish-red shades.

It has been found that very valuable monoazo dyestuffs of the general Formula I are obtained

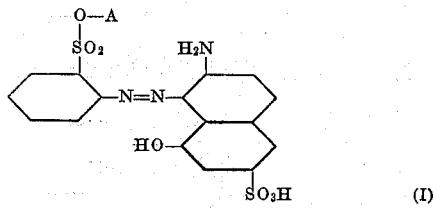

by the acid coupling of 2-amino-8-hydroxynaphthalene-6-sulphonic acid with diazotised 2-aminobenzene-1-sulphonic acid aryl esters. In the above formula A represents an aromatic radical of the benzene or naphthalene series which can contain non-ionogenic substituents usual in azo dyestuffs. These new dyestuffs produce very pure bluish-red dyeings on wool which are very fast to light. They have a good to sufficient levelling power together with good to very good fastness properties on wool according to the composition.

Diazo components which can be used according to this invention are obtained by reacting 2-nitrobenzene-1-sulphonic acid chloride with the alkali metal salts of aromatic hydroxyl compounds of the benzene and naphthalene series which in addition to the hydroxyl group can contain non-ionogenic substituents usual in azo dyestuffs, for example halogen, alkyl, alkoxy, aralkyl, aryl, cycloalkyl, annulated alkylene, acylamino, alkyl or aryl sulphonyl substituents, which substituents can, if desired also be substituted non-ionogenically, and then reducing the nitro group to the amino group. The 2-aminobenzene-1-sulphonic acid ester of 1-hydroxybenzene and the homologous alkyl compounds thereof are to be preferred. The dyestuff derived from phenol is distinguished by a particularly good levelling power on wool while those derived from alkyl or cycloalkyl phenols with 4 and more carbon atoms in the alkyl or cycloalkyl or annulated alkylene radical have very good wet fastness properties and particularly good fastness to milling and sea water as well as equally good fastness to light.

The 2-aminobenzene-1-sulphonic acid aryl esters usable according to the present invention are diazotised in a mineral acid solution or suspension in the cold with sodium nitrite; often the addition of organic solubility promoters such as lower alcohols, lower fatty acids or amides thereof ensures that the diazotisation proceeds in the desired manner. The coupling with 2-amino-8-hydroxynaphthalene-6-sulphonic acid or with the aqueous solutions of the alkali salts thereof is performed in the cold with an acid, preferably a mineral acid reaction. In the form of their alkali salts, the dyestuffs according to the present invention are red powders which dissolve in water with a bluish-red and in concentrated sulphuric acid with a red colour. According to their composition, they dye wool from a more or less acid bath in very pure, bluish-red shades which are fast to light.

The following examples illustrate the invention without limiting it in any way. The parts are given as parts by weight and the temperatures are in degrees centigrade.

Example 1

24.9 parts of 2-aminobenzene-1-sulphonic acid phenyl ester are dissolved warm in 90 parts of 80% acetic acid, 35 parts of concentrated hydrochloric acid are added and the whole is cooled to 5°. To this cold solution, a solution of 6.9 parts of sodium nitrite in 15 parts of water is added fairly quickly and the whole is stirred for an hour at 10°. The clear solution of the diazo compound is then poured within 30 minutes at 5–10° into a solution of the sodium salt of 23.9 parts of 2-amino-8-hydroxynaphthalene-6-sulphonic acid in 150 parts of water which has previously been made acid with acetic acid. The whole is stirred for 16 hours at 10–12°, the temperature is then slowly raised to 60° and stirring is continued for another hour at this temperature. Sodium carbonate is then added until there is a weakly alkaline reaction to litmus, the precipitated dyestuff is drawn off under suction at 65° and is washed well with 2.5% salt solution and dried. In the form of its sodium salt it is a brown-red powder which dissolves in water with a red and in concentrated sulphuric acid with bluish-red colour. It dyes wool very evenly from an acid bath in pure bluish-red shades.

The diazo component is obtained by reacting 2-nitrobenzene-1-sulphochloride with an aqueous sodium phenolate solution at 60–80° and reducing the nitro group to the amino group in the resulting 2-nitrobenzene-1-sulphonic acid phenyl ester in the presence of alcohol according to Béchamp.

Dyestuffs with similar properties with however, somewhat less good levelling power are obtained if instead of the above diazo component, 26.3 parts of 2-aminobenzene-1-sulphonic acid-2'- or -3'- or -4'-methyl phenyl ester of 27.7 parts of 2-aminobenzene-1-sulphonic acid-3'.4'- or 2'.4'-dimethyl phenyl ester are used and the same procedure is followed.

Example 2

31.9 parts of 2-aminobenzene-1-sulphonic acid-4'-tert. amylphenyl ester are dissolved warm in 90 parts of 80% acetic acid, 40 parts of concentrated hydrochloric acid are added and on cooling the hydrochloride crystallises out. Diazotisation is then performed at 0–5° by the slow dropwise addition of a solution of 6.9 parts of sodium nitrite in 25 parts of water within 2 hours. The whole is stirred until a clear solution is obtained. The diazo compound is poured within 30 minutes at 5–10° into a solution of the sodium salt of 23.9 parts of 2-amino-8-hydroxynaphthalene-6-sulphonic acid in 150 parts of water which has been previously made slightly acid with acetic acid. The whole is stirred for 10 hours at 10° and then for 16 hours at room temperature, the temperature is then brought slowly to 65° within one hour and the whole is kept at this temperature for one hour. Sodium carbonate is added to neutralise and the precipitated dyestuff is filtered off warm. It is washed with a 2% sodium chloride solution and dried. The sodium salt is obtained as a brownish-red powder which dissolves in hot water with a red and in concentrated sulphuric acid with a bluish-red colour. It dyes wool from an acid bath in pure bluish-red shades which are fast to light, milling and sea water.

Dyestuffs with similar properties are obtained if in the above example, the diazo component is replaced by the same number of parts of 2-aminobenzene-1-sulphonic acid-2'-methyl-4'-tert. butyl-phenyl ester, 33.1 parts of 2-aminobenzene - 1 - sulphonic acid - 4' - cyclohexyl phenyl ester, 30.3 parts of 2-aminobenzene-1-sulphonic acid-3'.4'-tetramethylene phenyl ester or by 35.1 parts of 2-aminobenzene-1-sulphonic acid-4'-di-isobutyl phenyl ester and otherwise the same procedure is followed.

These diazo components are obtained by the same method as is described in Example 1.

*Example 3*

28.4 parts of 2-aminobenzene-1-sulphonic acid-2'-chlorophenyl ester are diazotised as described in Example 1 and the clear diazo solution is poured within 30 minutes at 5–10° into an acetic acid solution of the sodium salt of 23.9 parts of 2-amino-8-hydroxynaphthalene-6-sulphonic acid in 150 parts of water. The whole is stirred for 10 hours at 10° and then for 16 hours at room temperature, then heated within one hour to 65°, kept an hour at this temperature, neutralised with sodium carbonate and the precipitated dyestuff is filtered off hot. It is well washed with a warm 2.5% sodium chloride solution and dried. A red powder is obtained which dissolves in water with a red and in concentrated sulphuric acid with a bluish-red colour. It dyes wool from an acid bath in bluish-red shades which are fast to light.

Dyestuffs with similar properties are obtained if in the above example the same number of parts of the corresponding 3'- or 4'-chlorophenyl ester are used. A similar dyestuff is also obtained if instead of the above diazo component, 32.7 parts of 2-aminobenzene-1-sulphonic acid-4'-methyl sulphonyl phenyl ester or 34.1 parts of 2-aminobenzene-1-sulphonic acid-4'-ethyl sulphonyl phenyl ester are used. These diazo components also can be obtained according to the method described in Example 1.

*Example 4*

100 parts of previously wetted wool are entered at 40° into a bath containing 3000 parts of water, 2 parts of the monoazo dyestuff obtained according to Example 1, 10 parts of sodium sulphate and 2 parts of acetic acid. The bath is brought to the boil within half an hour, 1 part of formic acid is added and the bath is boiled for a further half hour. The goods are then rinsed cold and dried. A very level, pure bluish-red wool dyeing is obtained which has very good fastness to light.

What I claim is:

1. A monoazo dyestuff having the general formula:

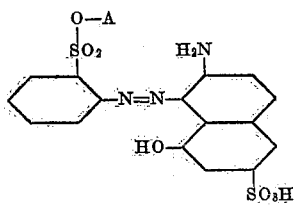

wherein A represents an aromatic radical of the benzene series free from water-solubilizing groups.

2. A monoazo dyestuff having the general formula:

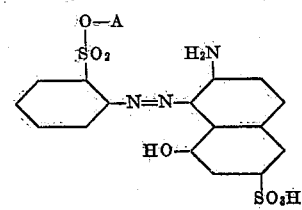

wherein A represents a member selected from the group consisting of phenyl and lower alkyl substituted phenyl radicals.

3. A monoazo dyestuff having the formula:

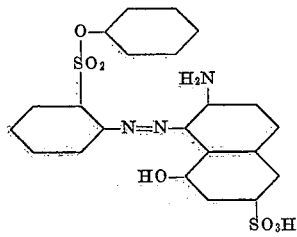

4. A monoazo dyestuff having the formula:

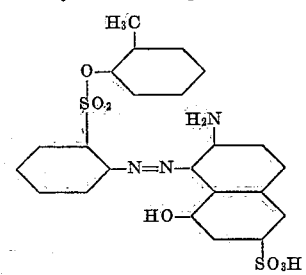

5. A monoazo dyestuff having the formula:

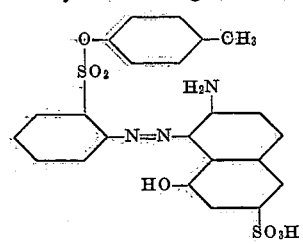

6. A monoazo dyestuff having the formula:

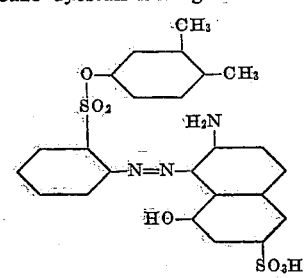

7. A monoazo dyestuff having the formula:

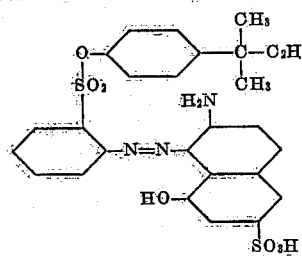

References Cited in the file of this patent
UNITED STATES PATENTS
1,943,170    Felix _____ Jan. 9, 1934